(12) United States Patent
Kim et al.

(10) Patent No.: US 7,807,235 B2
(45) Date of Patent: Oct. 5, 2010

(54) RETARDATION FILM HAVING A HOMEOTROPIC ALIGNMENT LIQUID CRYSTAL FILM

(75) Inventors: Eun-Kyung Kim, Daejeon (KR); Moon-Soo Park, Daejeon (KR); Jun-Won Chang, Daejeon (KR); Sin-Young Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 576 days.

(21) Appl. No.: 11/353,226

(22) Filed: Feb. 14, 2006

(65) Prior Publication Data

US 2006/0182900 A1    Aug. 17, 2006

(30) Foreign Application Priority Data

Feb. 16, 2005    (KR) .................... 10-2005-0012815

(51) Int. Cl.
    *G02B 5/30*    (2006.01)
    *G02F 1/1337*    (2006.01)
    *G02F 1/13363*    (2006.01)

(52) U.S. Cl. .................. 428/1.1; 428/1.2; 428/1.31; 349/117; 349/130

(58) Field of Classification Search .............. 428/1.1, 428/1.3, 1.31, 1.5, 1.2; 252/299.01; 349/117, 349/130

See application file for complete search history.

(56) References Cited

U.S. PATENT DOCUMENTS

| | | | |
|---|---|---|---|
| 5,688,436 A * | 11/1997 | Ohnishi et al. ......... | 252/299.01 |
| 6,115,095 A | 9/2000 | Suzuki et al. | |
| 6,912,029 B2 * | 6/2005 | Tanaka ...................... | 349/118 |
| 2005/0179003 A1 * | 8/2005 | Heckmeier et al. ..... | 252/299.01 |
| 2006/0127603 A1 * | 6/2006 | Kim et al. .................... | 428/1.1 |
| 2006/0257649 A1 * | 11/2006 | Kawamoto et al. .......... | 428/336 |

FOREIGN PATENT DOCUMENTS

| | | | |
|---|---|---|---|
| JP | 06-148429 | | 5/1994 |
| JP | 2000-227520 | | 8/2000 |
| JP | 2001-166133 | | 6/2001 |
| JP | 2003-149441 | | 5/2003 |
| JP | 2004-29062 | | 1/2004 |
| WO | WO 0244801 | * | 6/2002 |
| WO | WO-2004079417 | * | 9/2004 |

* cited by examiner

*Primary Examiner*—Shean C Wu
(74) *Attorney, Agent, or Firm*—McKenna Long & Aldridge LLP

(57) ABSTRACT

The present invention relates to a retardation film having a homeotropic alignment liquid crystal film prepared from coating a liquid crystal mixed solution containing a polymerizable reactive liquid crystal monomer on an oriented retardation film so as to improve a viewing angle characteristic of an ISP mode liquid crystal display and reduce a color shift and a method for preparing the same. There is an advantage in that since a homeotropic alignment liquid crystal film with a retardation of a thickness direction is prepared using a liquid crystal mixed solution containing a reactive liquid crystal monomer, the retardation film according to the present invention is not required for high-temperature heat treatment and cooling processes so that it can be applied to a high-speed continuous process.

4 Claims, 11 Drawing Sheets

[Fig. 1]
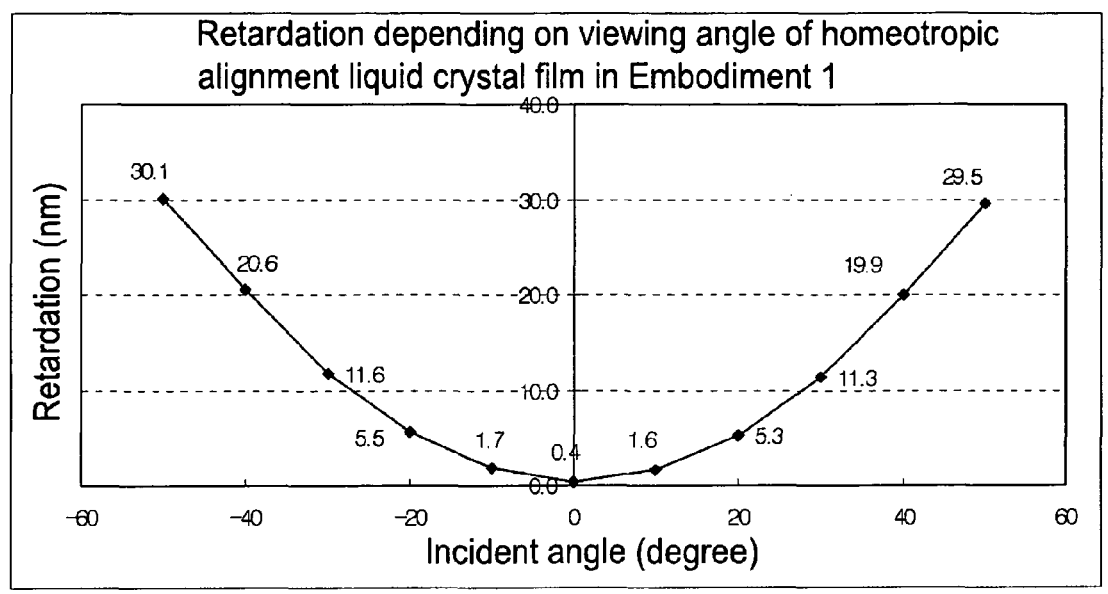

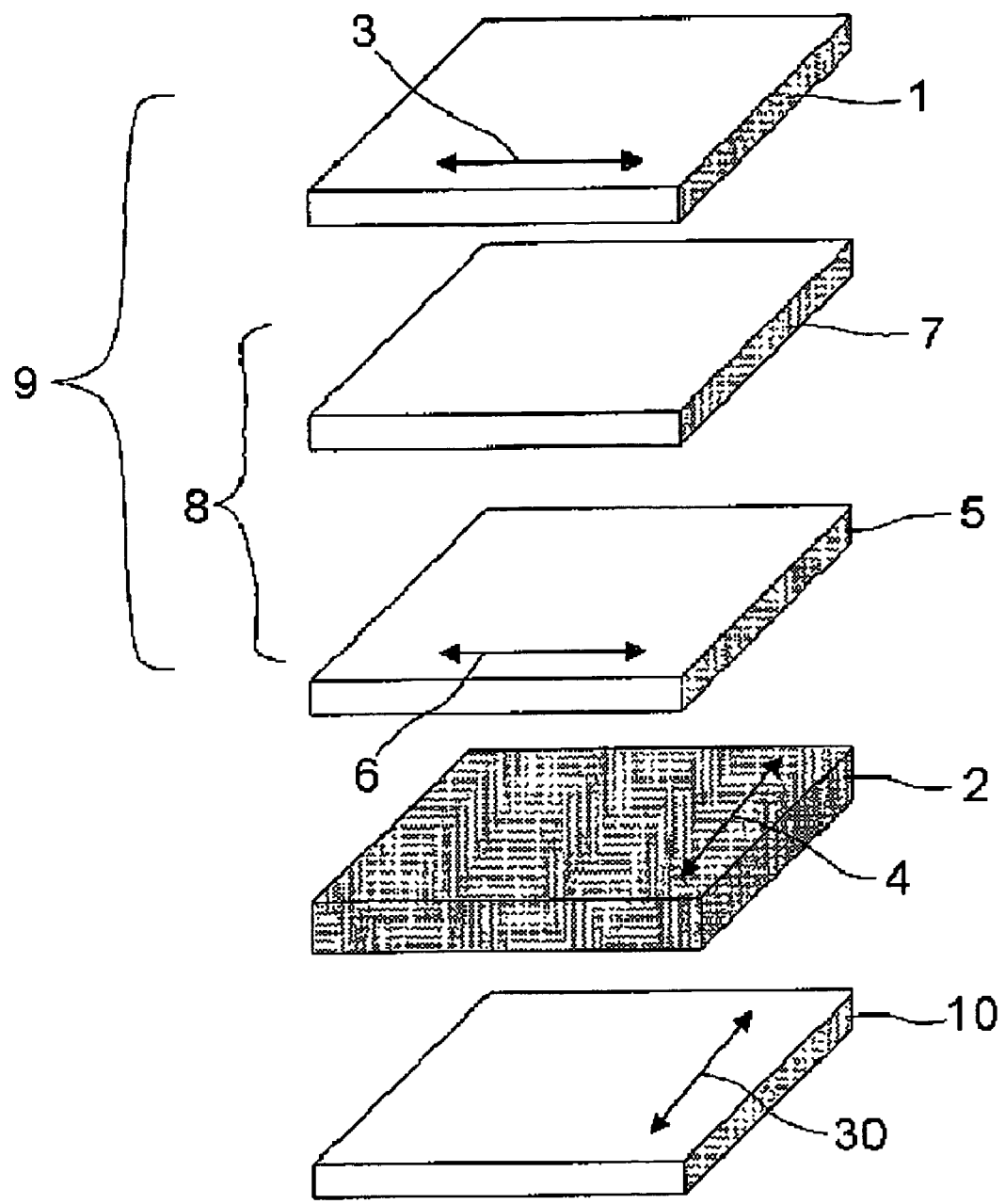
[Fig. 2]

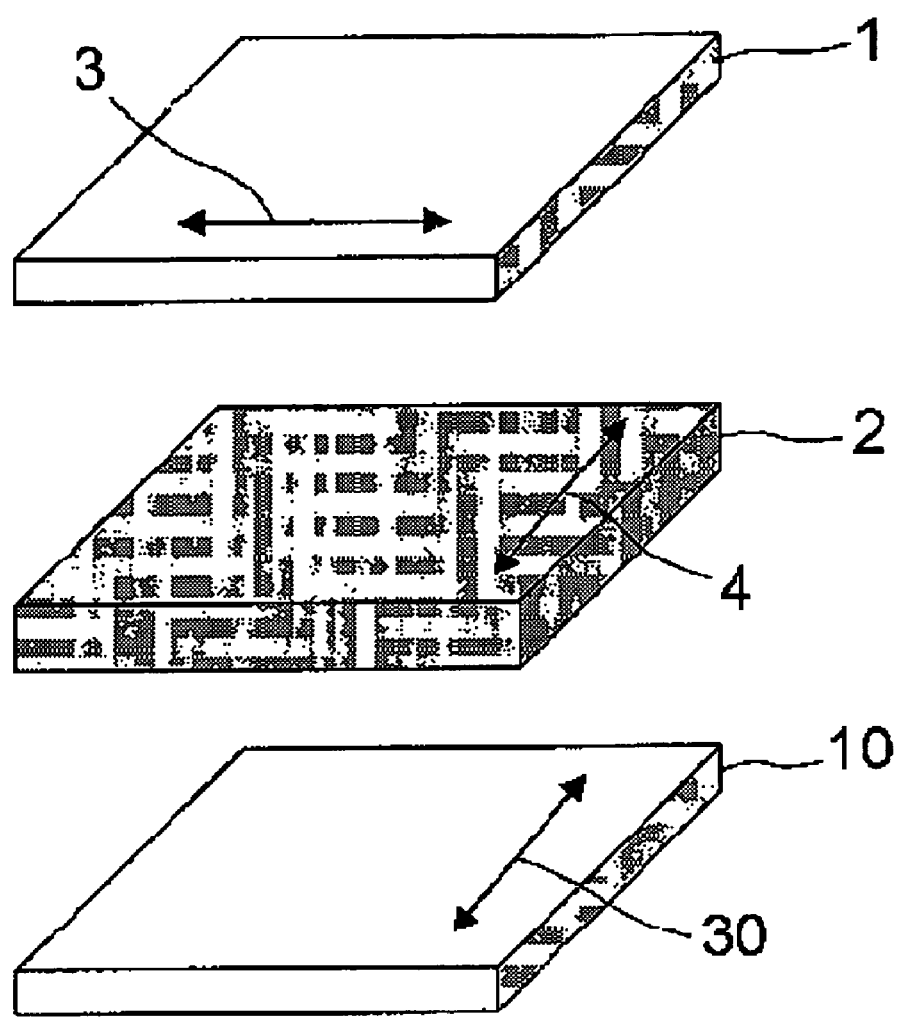
[Fig.3]

[Fig.4]
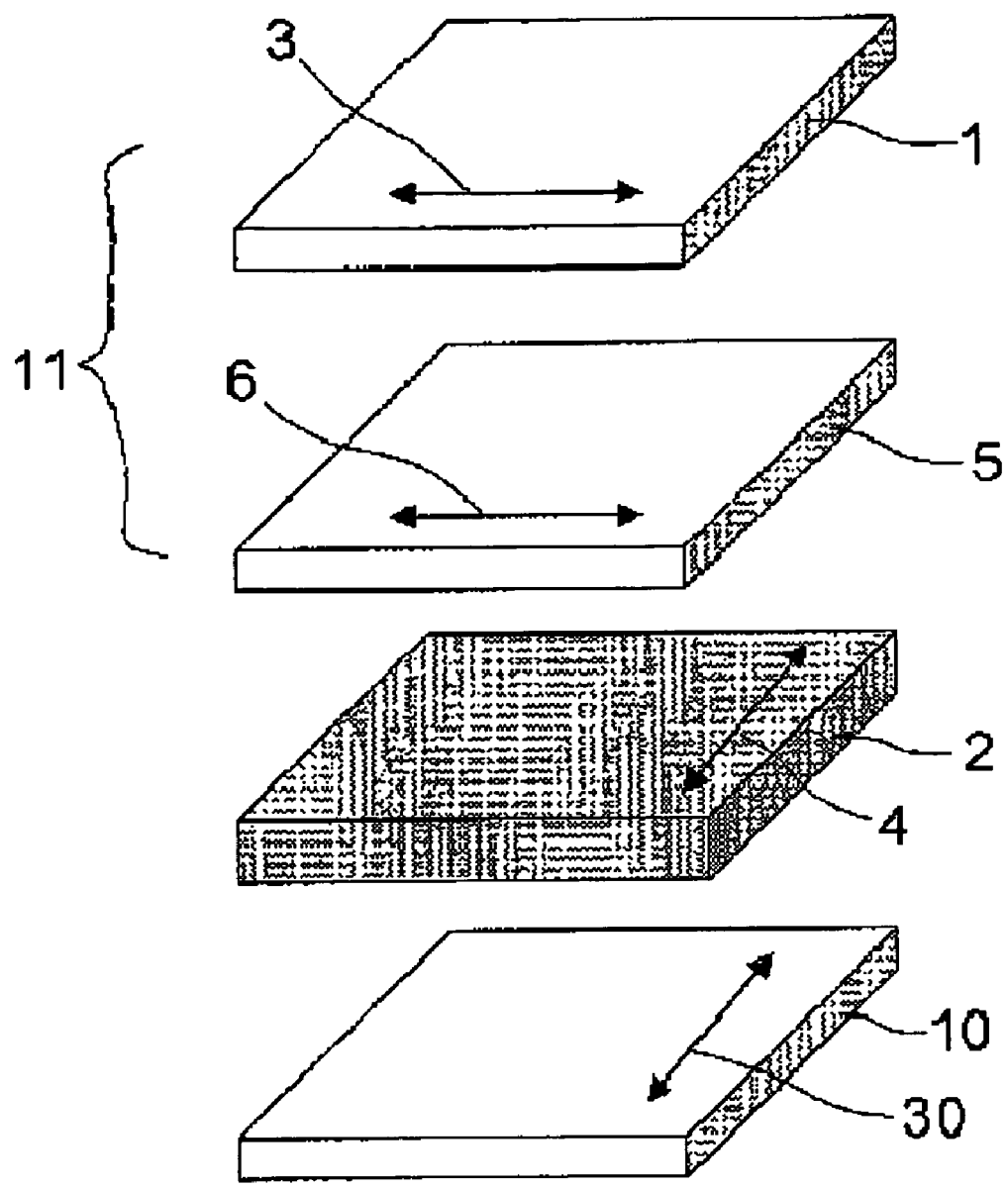

[Fig.5]
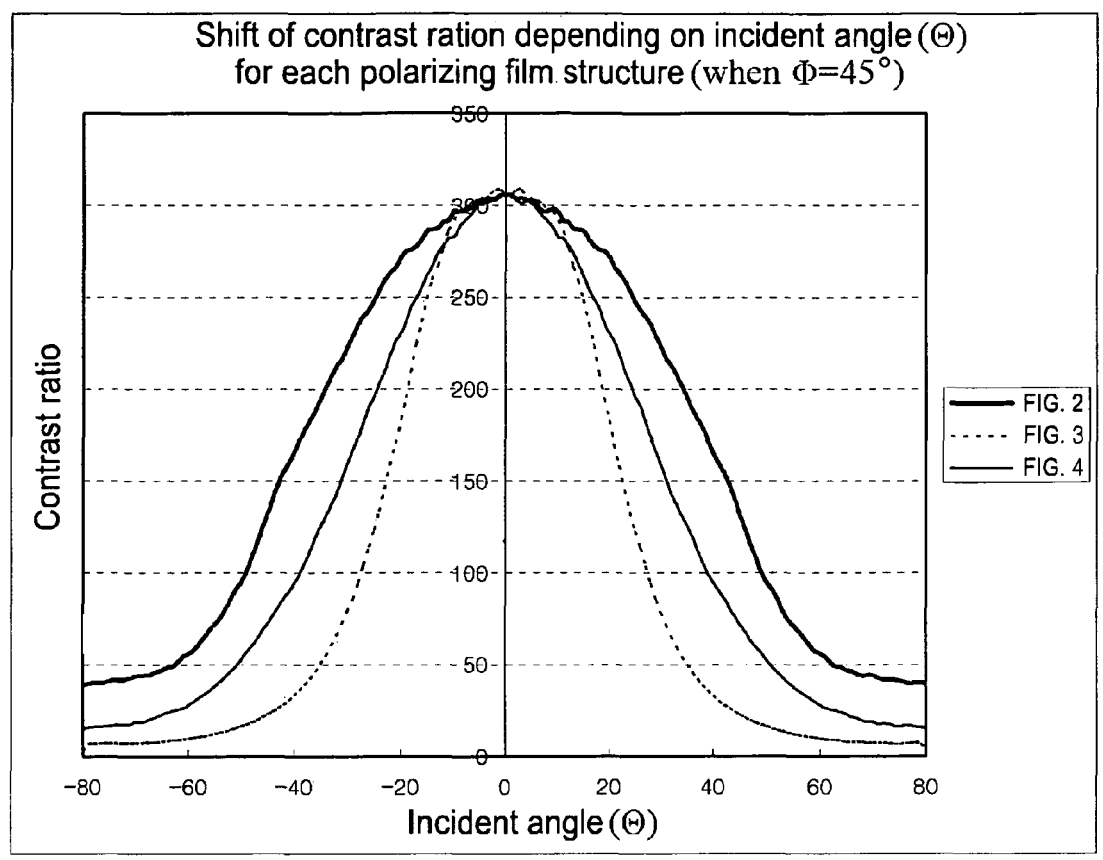

[Fig.6]
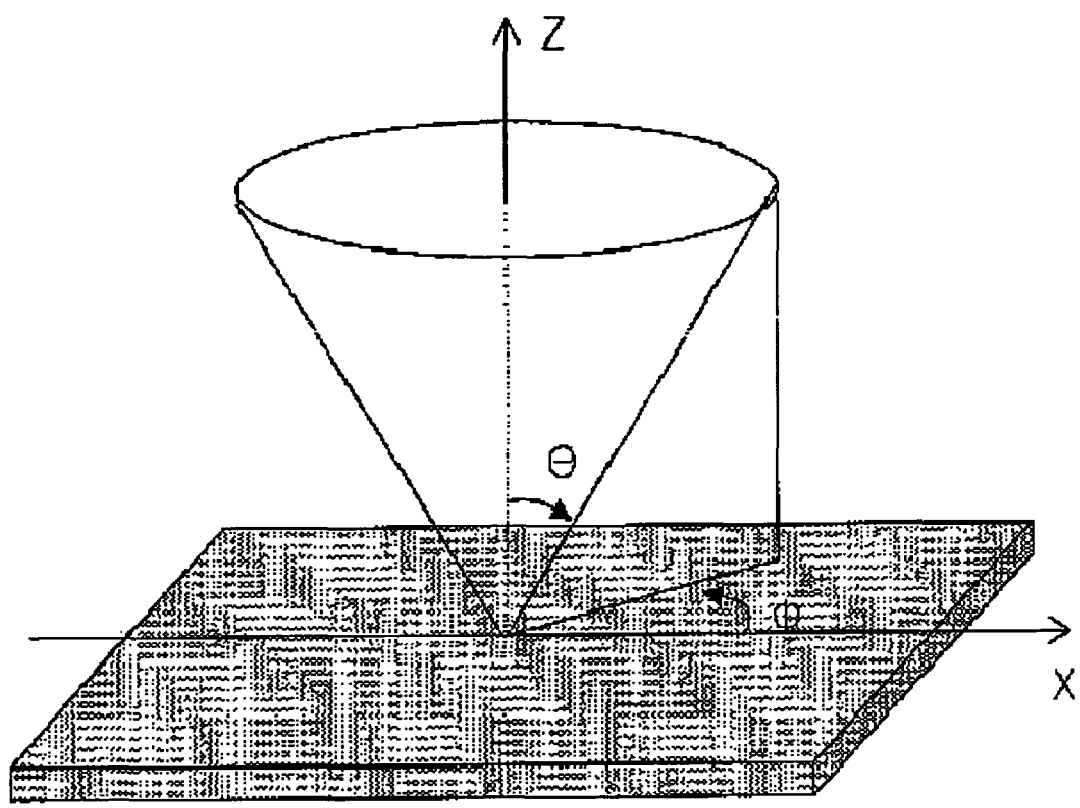

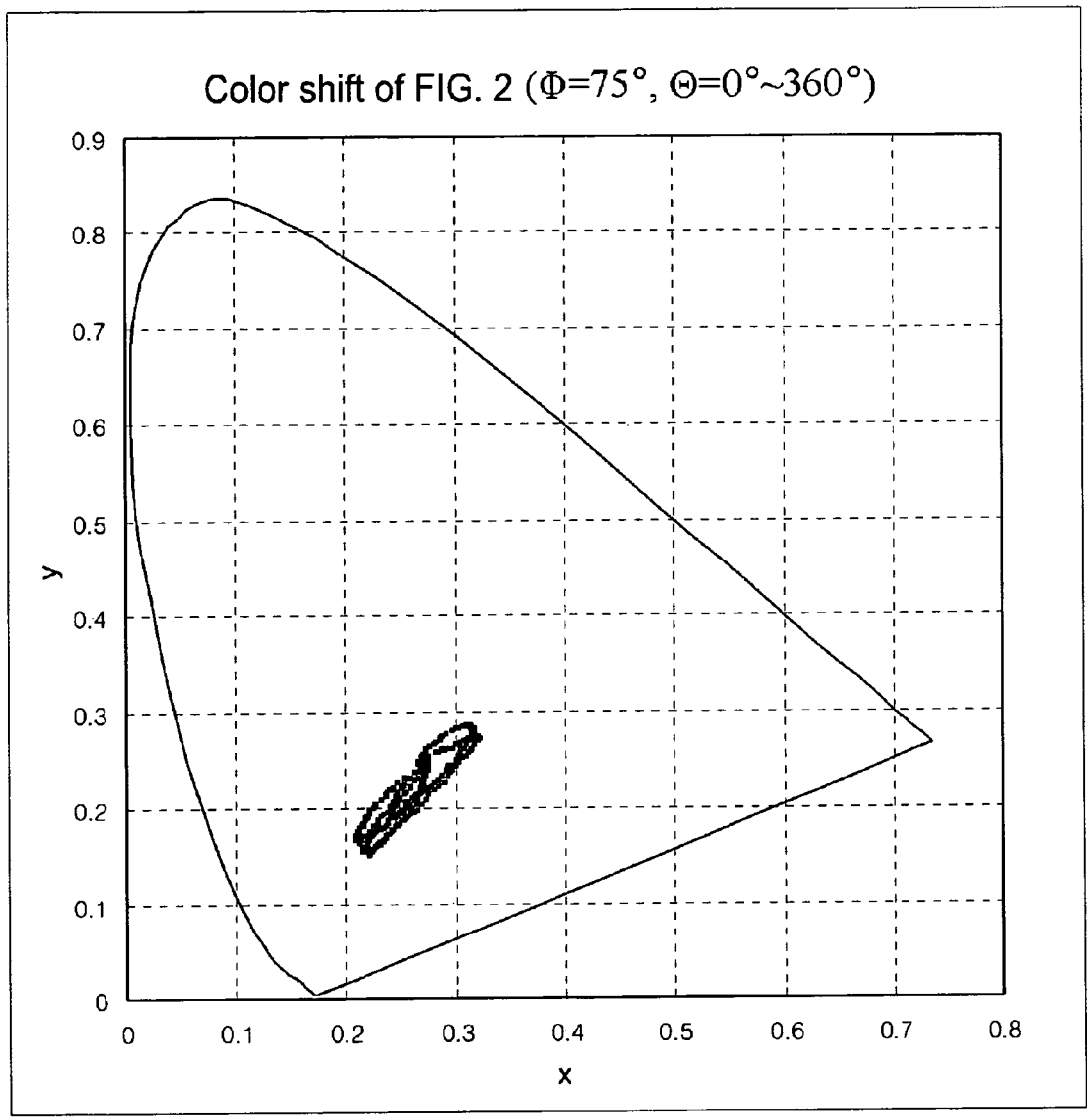
[Fig.7]

[Fig.8]
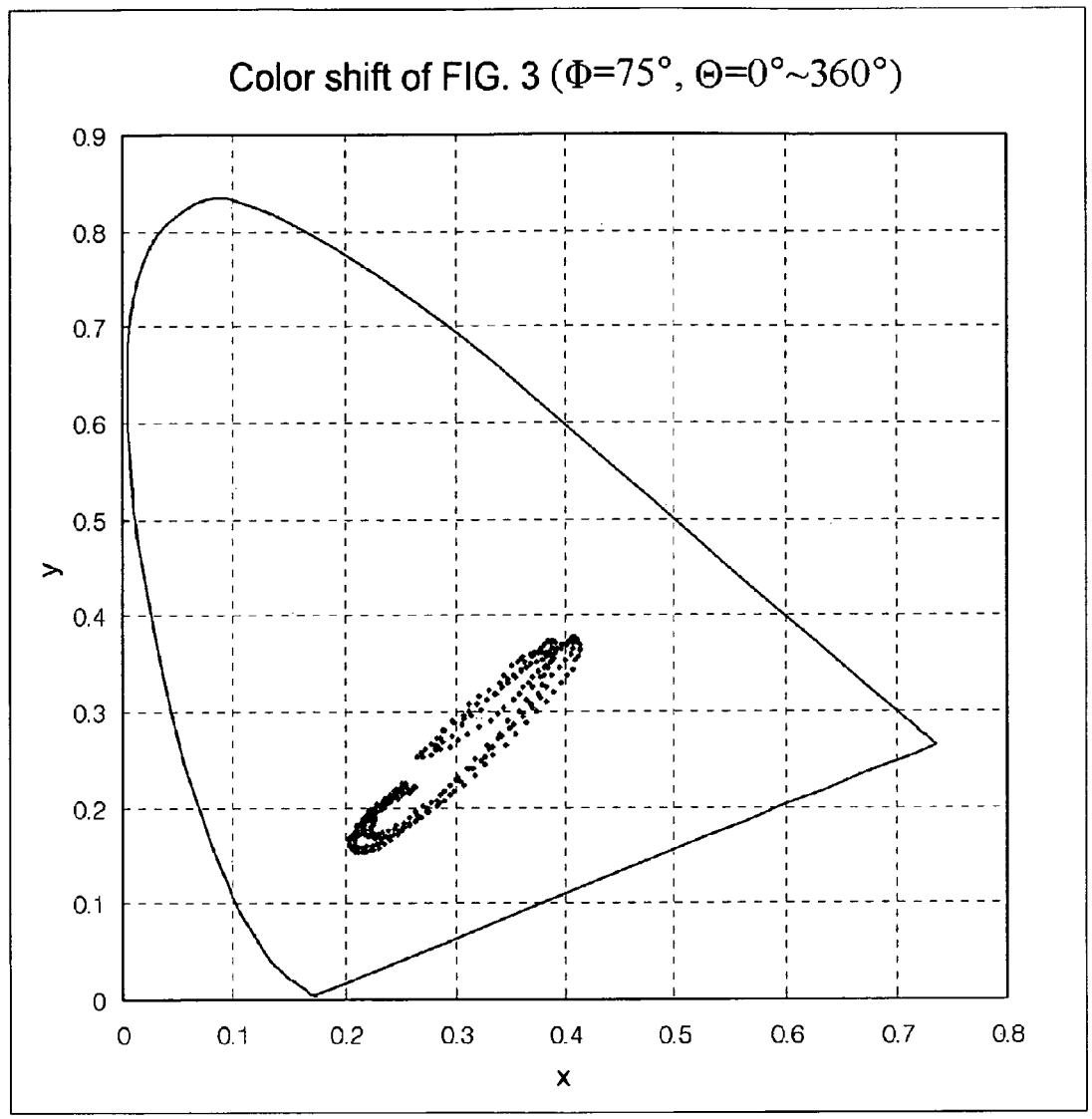

[Fig.9]
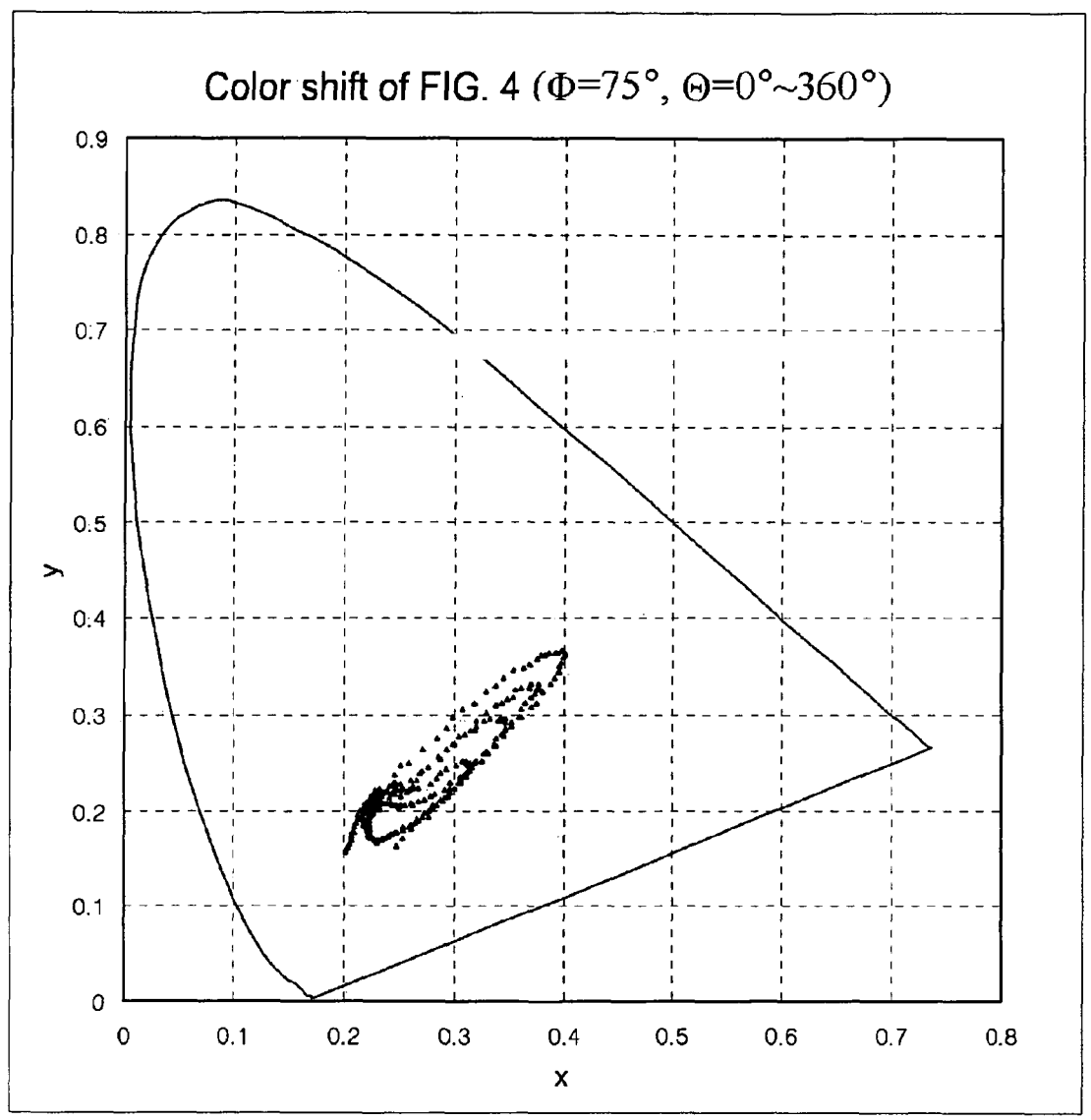

[Fig.10]
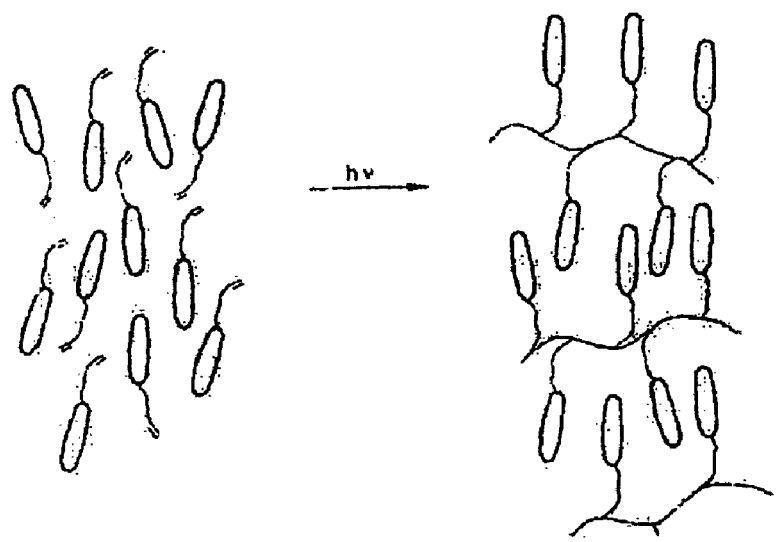
[Fig.11]
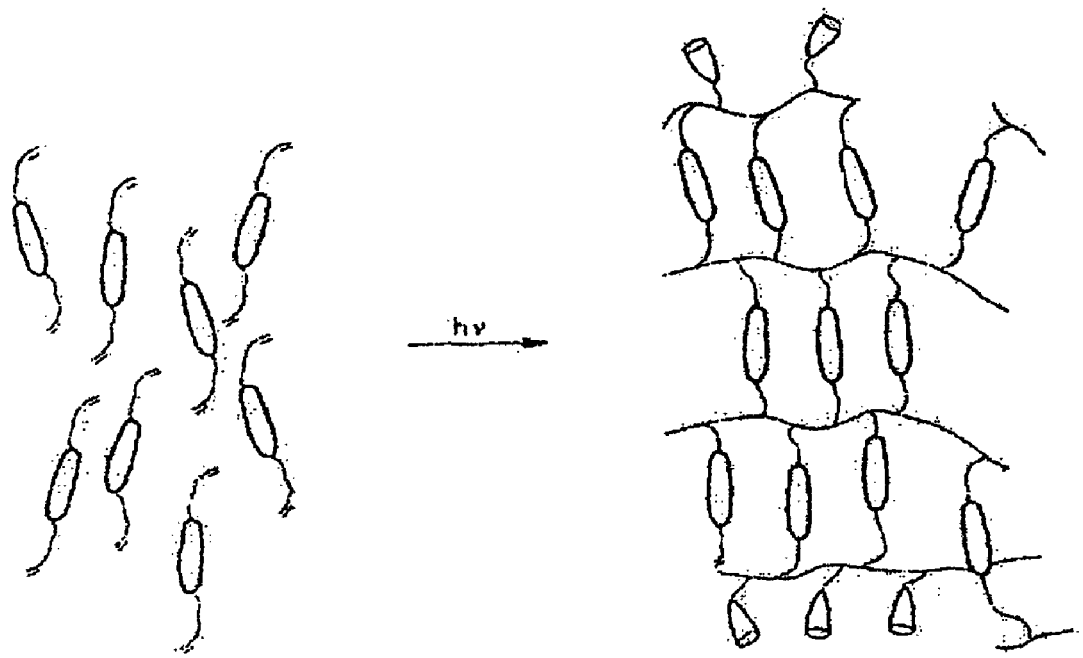

[Fig.12]
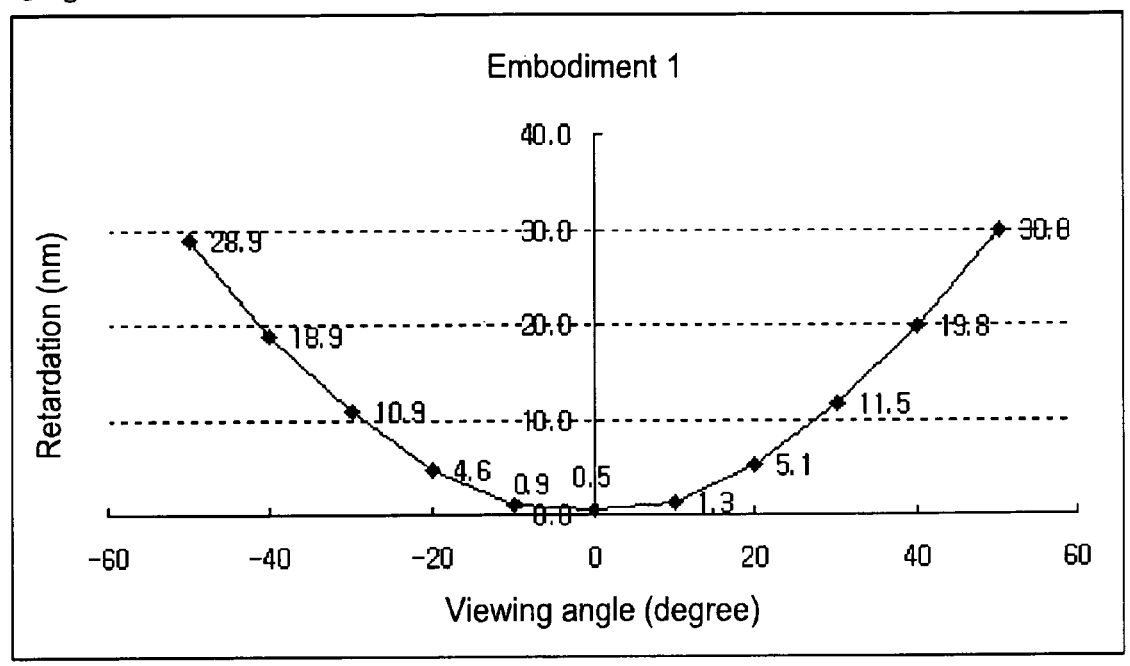

RETARDATION FILM HAVING A HOMEOTROPIC ALIGNMENT LIQUID CRYSTAL FILM

This application claims the benefit of the filing date of Korean Patent Application No. 10-2005-0012815 filed on Feb. 16, 2005 in the Korean Intellectual Property Office, the disclosure of which is incorporated herein in its entirety by reference.

TECHNICAL FIELD

The present invention relates to a retardation film having a homeotropic alignment liquid crystal film, a polarizing film, an IPS (In-Plane Switching) mode liquid crystal display and a method for preparing the same. More particularly, the present invention relates to a homeotropic alignment liquid crystal film prepared from a liquid crystal mixed solution containing a polymerizable reactive liquid crystal monomer so as to improve a viewing angle characteristic of an ISP mode liquid crystal display and reduce a color shift; a retardation film prepared by integrating an oriented retardation film and a method for preparing the same; a polarizing film having the retardation film located between a polarizing element or plate and a liquid crystal cell and a method for preparing the same; and an IPS mode liquid crystal display having the polarizing film.

BACKGROUND ART

In general, a narrow viewing angle is one of the most vulnerable points of a liquid crystal display having good points in terms of lightweight, thin type, low power consumption and the like. The narrow viewing angle means that a completely different image is displayed on a display screen depending on a direction to which a person sees the display screen. As such, the reason why an image is differently seen depending on a viewing angle in a liquid crystal display results from the anisotropy of liquid crystal and imperfection of a polarizing plate.

The viewing angle refers to an angle at which a contrast ratio is usually 10:1 or more. To this end, a dark state being a completely dark state and uniform brightness are required. A variety of attempts for improving a viewing angle of a liquid crystal display have been made considering such requirements.

As an example of methods for improving an optical viewing angle, in TN (Twisted Nematic) mode is used a method such as a compensation film, DDTN (Dual-Domain TN), MDTN (Multi-Domain TN) or the like. In VA (Vertical Alignment) mode, for example, is used an advantage in that a normally black mode in which an initial alignment direction is set to be a vertical direction is used contrary to a TN mode liquid crystal display frequently using a normally white mode so that a complete dark state is achieved due to a dark state by means of two sheets of front and rear polarizing plates, thereby increasing a contrast ratio. In IPS (In-Plane Switching) mode is used a method in that liquid crystal is rotated on a plane when the liquid crystal is horizontally aligned, and two electrodes are driven on one substrate so that light is transmitted or shielded, thereby improving an optical viewing angle.

In particular, since light quantity is controlled by means of horizontal movement of liquid crystal in the IPS mode so that a viewing angle characteristic becomes considerably better, the IPS mode is being used in a large number of products at present. Contrary to the VA mode, the IPS mode has superior characteristics of a viewing angle and a color shift even in a state where a retardation film is not basically applied.

Further, U.S. Pat. No. 6,115,095 discloses that there are suggested structures where +C-PLATE, which is a positive uniaxial, optical anisotropic film and perpendicular to a plane with respect to an optical axis, is attached, and +A-PLATE, which is a positive uniaxial, optical anisotropic film and parallel to a plane with respect to an optical axis, is attached so that these retardation films are applied to the IPS mode, thereby obtaining more superior characteristics of a viewing angle and a color shift.

As disclosed in Japanese Patent Laid-open Publication No. 2001-166133, a retardation characteristic is controlled through an appropriate method in that a film is made of a polymer is processed to extend, or a refractive index of a thickness direction is controlled so that such a retardation film can be obtained. In particular, the retardation film may be obtained through a method in that a sheet or two sheets of heat-shrinkable films is adhered to a single surface or double surfaces of a film using an adhesive layer or the like, and a contractile force of the heat-shrinkable film is then added to film by means of heat so that the film is extended or contracted in a longitudinal or lateral direction, or both directions under the contractile force.

Further, Japanese Patent Laid-open Publication No. 2000-227520 discloses that assuming that main refractive indexes within a plane be $n_x$ and $n_y$, a refractive index of a thickness direction be $n_z$, and $n_x \geq n_y$, a retardation plate comprises a combination of more than two kinds of retardation films with refractive indexes different from one another, the retardation films each having a refractive index characteristic of $n_x=n_y>n_z$, $n_x>n_y>n_z$, $n_x>n_y=n_z$, $n_x>n_z>n_y$, $n_x=n_z>n_y$, $n_z>n_x>n_y$, or $n_z>n_x=n_y$. In addition, alignment films which are made of various liquid crystal polymers such as a discotic or nematic system, of which alignment layer is supported by a film substrate, or the likes are used as the retardation film.

Further, Japanese Patent Laid-open Publication No. 2003-149441 discloses a retardation film wherein C-PLATE, which is a homeotropic alignment liquid crystal film formed from a homeotropic alignment liquid crystal composition containing a homeotropic alignment side-chain liquid crystal polymer or a correspondent side-chain liquid crystal polymer, and a photopolymerizable liquid crystal compound, and A-PLATE, which is an oriented film with a function of retardation, are laminated and integrated so that a retardation of a thickness direction can be widely controlled.

In this Japanese Patent Laid-open Publication No. 2003-149441, a side-chain liquid crystal polymer, which is a liquid crystal polymer for forming a homeotropic alignment liquid crystal film and comprises a monomer unit (a) containing a liquid crystalline fragment side-chain with a positive refractive index anisotropy and a monomer unit (b) containing a non-liquid crystalline fragment side-chain, is used; the side-chain liquid crystal polymer has the monomer unit (b) containing a non-liquid crystalline fragment side-chain with a alkyl chain and the like except the monomer unit (a) containing a liquid crystalline fragment side-chain included in an ordinary side-chain liquid crystal polymer; and although a hometropic alignment film is not used, a nematic liquid crystal phase is revealed as a liquid crystal state through an operation of a monomer unit containing the non-liquid crystalline fragment side-chain, e.g., through a heat treatment so that a homeotropic alignment can be shown.

However, a retardation film obtained through the methods disclosed in the Japanese Paten Laid-open Publication Nos. 2001-166133 and 2000-227520 has a limitation on its extension to a thickness direction, and there is a problem in that a retardation of the thickness direction cannot be widely controlled. Further, the method of contracting a retardation film by adding the contraction force of a heat-shrinkable film to a film has a problem in that the thickness of the retardation film becomes thick in the range of about 50 to 100 μm so that requirement of reduction in thickness is not sufficiently met.

Further, the method of forming a homeotropic alignment liquid crystal film using a side-chain liquid crystal polymer as disclosed in the Japanese Patent Laid-open Publication No. 2003-149441 has problems in that since a glass transition temperature (Tg), which is a heat treatment temperature allowing the homeotropic alignment liquid crystal film to have a liquid crystal phase, is usually in the range of 60 to 300° C., more specifically in the range of 70 to 200° C., there is required a high temperature heat treatment process; that since time consumed in the heat treatment is also in the range of 20 seconds to 30 minutes, it is difficult to apply the method to a high-speed continuous process; that since there is required a cooling operation of air-cooling, water-cooling or the like to fix the alignment of the homeotropic alignment liquid crystal film after the heat treatment has been finished, it is difficult to apply the method to a continuous process; and that a liquid crystal polymer compound containing a liquid crystal polymer has a low solubility of a compatible solvent.

DISCLOSURE OF INVENTION

Technical Problem

The present invention is conceived to solve the aforementioned problems. Accordingly, an object of the present invention is to provide a new retardation film wherein a contrast ratio of an IPS mode liquid crystal display can be more increased, a color shift can be more reduced, and a retardation of a thickness direction can be widely controlled.

Another object of the present invention is to provide a method for preparing a retardation film, wherein there are not required high temperature heat treatment and cooling processes for a long time so that the method can be applied to a high-speed continuous process.

A further object of the present invention is to provide a polarizing film wherein the retardation film is attached on one surface of a polarizing element or polarizing plate adjacent to a liquid crystal cell so that the retardation film is located between the polarizing element or polarizing plate, and a method for preparing the same.

A still further object of the present invention is to provide an IPS mode liquid crystal display including the polarizing film.

Technical Solution

In order to achieve these and other objects of the invention, there is provided a retardation film wherein an oriented film and a homeotropic alignment liquid crystal film formed from a solution containing a polymerizable reactive liquid crystal monomer are laminated such that they are integrated, and the contrast ratio and color shift characteristic of an IPS liquid crystal display are largely improved by a polarizing film in which the retardation film is laminated between a polarizing element or polarizing plate comprising the polarizing element and a transparent protection film, and a liquid crystal cell.

The homeotropic alignment liquid crystal film is such a homeotropic alignment liquid crystal film wherein a liquid crystal layer with a homeotropic alignment property is prepared by coating, drying and UV light radiating a polymerizable liquid crystal mixed solution containing a surfactant and a reactive liquid crystal monomer on a surface of an oriented retardation film of which surface is treated to be hydrophilic, so that there is needed no additional alignment film. Further, the reactive liquid crystal monomer is a reactor combined with neighboring liquid crystal monomers by means of light or heat and may use one or more of those selected from the group having an acrylate group attached thereto.

Additionally, although a material of the oriented retardation film is one or more of those selected from the group consisting of triacetyl cellulose, polyethylene terephtalate, polymethyl methacrylate, polycarbonate, polyethylene and cycloolefin polymer such as norbornene derivatives, polyvinyl alcohol, diacetyl cellulose, polyether sulfone, it is not limited thereto.

Further, according to another aspect of the present invention for achieving the object, there is provided a method for preparing a retardation film, comprising a step of preparing a retardation film in which a homeotropic alignment liquid crystal film is formed by coating, drying and UV light radiating a polymerizable liquid crystal mixed solution containing a surfactant and a reactive liquid crystal monomer on a surface of an oriented retardation film of which surface is treated to be hydrophilic, so that the oriented retardation film and the homeotropic alignment liquid crystal film are integrated.

Furthermore, according to a further aspect of the present invention for achieving the object, there is provided a method for preparing a retardation film, comprising the steps of: preparing a homeotropic alignment liquid crystal film by coating, drying and UV light radiating a solution containing a surfactant and a polymerizable reactive liquid crystal monomer on a plastic substrate of which surface is treated to be hydrophilic; and attaching an oriented retardation film on the homeotropic alignment liquid crystal film using an adhesive such that they are integrated.

BRIEF DESCRIPTION OF DRAWINGS

FIG. 1 is a view showing a shift curve of a retardation value depending on a viewing angle of a homeotropic alignment liquid crystal film obtained through Embodiment 1.

FIG. 2 is an exploded perspective view showing a sectional structure of a first preferred embodiment in which a retardation film according to the present invention is arranged between a polarizing plate and a liquid crystal cell.

FIG. 3 is an exploded perspective view showing a structure in which a retardation film is not arranged between a polarizing plate and a liquid crystal cell.

FIG. 4 is an exploded perspective view showing a structure in which only an oriented retardation film is arranged between a polarizing plate and a liquid crystal cell.

FIG. 5 is a graph showing a contrast ratio when an incident angle is shifted to 80 degrees at an azimuth angle of 45 degrees with respect to each structure of FIGS. 2 to 4.

FIG. 6 is a view showing an azimuth angle ($\Phi$) and a polar angle ($\Theta$) in a spherical coordination system.

FIG. 7 is a graph shown a color shift characteristic of a preferred embodiment according to the present invention.

FIG. 8 is a graph showing a color shift characteristic of a liquid crystal display with a structure of FIG. 3.

FIG. 9 is a graph showing a color shift characteristic of a liquid crystal display with a structure of FIG. 4.

FIG. 10 is a view showing a structure after polymerizing a reactive liquid crystal monomer of Chemical Formula 1 or Chemical Formula 2.

FIG. 11 is a view showing a structure after polymerizing a reactive liquid crystal monomer of Chemical Formula 3.

FIG. 12 is a view a shift curve of a retardation value depending on a viewing angle of a homeotropic alignment liquid crystal film obtained through Comparative Example.

MODES FOR CARRYING OUT THE INVENTION

Hereinafter, the present invention will be described more fully with reference to the accompanying drawings.

A retardation film provided by the present invention can be obtained by first fabricating a homeotropic alignment liquid crystal film from a liquid crystal mixed solution containing a polymerizable reactive liquid crystal monomer and then laminating an oriented retardation film on the homeotropic alignment liquid crystal film such that they are integrated.

to be homeotropically aligned. Accordingly, the liquid crystal layer is homeotropically aligned without forming an additional alignment film.

The polymerizable reactive liquid crystal monomer is polymerized with neighboring liquid crystal monomers by means of light or heat and then formed as a liquid crystal polymer. Preferably, one or more of those selected from the acrylate group attached thereto are used as a reactor which causes a polymerization reaction with the reactive liquid crystal monomer. More preferably, the liquid crystal polymer includes the reactive liquid crystal monomer of the following Chemical Formula 3 and may include at least one or more of the reactive liquid crystal monomers of the following Chemical Formulas 1 and 2.

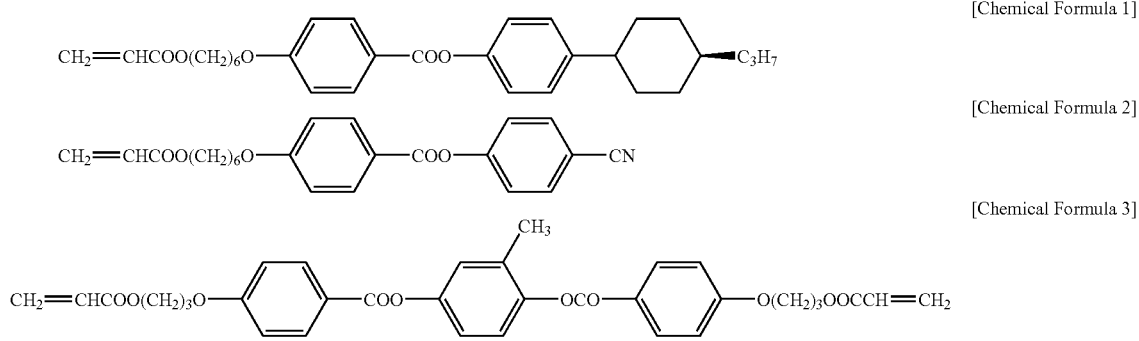

[Chemical Formula 1]

[Chemical Formula 2]

[Chemical Formula 3]

At this time, although the content of a solid made of the liquid crystal contained in the liquid crystal mixed solution and a photoinitiator is different depending on a thickness of a liquid crystal layer and a coating method, it is not specifically limited thereto but is preferably composed of 10 to 50 wt % in the total liquid crystal mixed solution.

Further, the photoinitiator is preferably composed of 3 to 10 wt. % of the total solid of 100 wt %.

In general, a liquid phase surfactant of 0.3 to 3 wt. % is added with the total solid as reference, and a glass substrate being a typical hydrophilic substrate or a plastic substrate of which surface is treated to be hydrophilic is used as a substrate on which the liquid crystal mixed solution is coated.

The surfactant is classified into a fluorocarbon-based surfactant and a silicon-based surfactant. Novec (product name) FC4430 and Novec FC4432, produced by 3M in U.S.A., Zonyl produced by Dupont in U.S.A., or the like is used as the fluorocarbon-based surfactant, and BYK (product name) produced by BYK-Chemie is used as the silicon-based surfactant.

As described above, the content of the surfactant is preferably 0.3 to 3.0 wt. % with the total mass of the solid contained in the total solution by reference. This is because there is caused a problem in that in case of below 0.3 wt. %, the state of a liquid crystal alignment is inferior, and in case of over 3.0 wt. %, the state of a liquid crystal alignment is inferior, besides, the spreading property of a solution is increased so that its coating property is considerably degraded.

Further, such a surfactant allows a terminal group with its hydrophilic group to move and adhere to the surface of a glass substrate or a plastic substrate treated to be hydrophilic, and makes a liquid crystal layer obtained through coating, drying and UV radiating processes of a liquid crystal mixed solution To have a network structure, the liquid crystal polymer includes the compound of the Chemical Formula 3, besides, may selectively include the compound of the Chemical Formula 1 or 2.

If a reactive liquid crystal solution is prepared by mixing the Chemical Formula 3 and the Chemical Formula 1 or 2, the range of Tg, which is a glass transition temperature of a homeotropic alignment liquid crystal film, becomes wide so that a stable structure can be maintained from an external thermal factor.

The photoinitiator is classified into a free radical photoinitiator and a cationic photopolymerization initiator depending on a kind of material initiating a polymerization reaction. Irgacure (product name) 907, Irgacure 651, Irgacure 184 or the like, produced by Ciba-Geigy in Switzerland is used as the free radical photoinitiator, and UVI (product name) 6974 or the like, produced by Union Carbide in U.S.A. is used as the cationic photopolymerization initiator.

If a solvent has superior melting and coating properties with the reactive liquid crystal monomer and does not corrode machine, it is not specifically limited to a kind of the solvent forming the reactive liquid crystal solution together with the aforementioned surfactant, reactive liquid crystal monomer and photoinitiator. In particular, it can be seen that the solubility of a compatible solvent is more improved as compared with a liquid crystal polymer compound if the reactive liquid crystal monomer is used. Microscopically, the superior solubility means that solvent molecules can easily permeate between solute molecules, and thus it can be easily seen that the solubility of the liquid crystal monomer with a short molecular length is superior to that of the liquid crystal polymer compound with a long molecular length.

For example, although halogenated hydrocarbons such as chloroform, tetrachloroethane, trichloroethylene, tetrachloroethylene and chlorobenzene; aromatic hydrocarbons such as benzene, toluene, xylene, methoxybenzene and 1,2-dimethoxybenzene; ketones such as acetone, methyl ethyl ketone, cyclohexanone and cyclopentanone; alcohols such as isopropyl alcohol, n-butanol; cellosolves such as methyl cellosolve, ethyl cellosolve, butyl cellosolve; or the likes are used as the solvent, it is not limited thereto but may be used in the form of a single or mixed compound.

Next, a hydrophilic treatment for causing a surface of a plastic substrate to have a hydrophilic group and the plastic substrate suitable therefor in the present invention will be described below.

A corona discharge treatment or an alkali treatment may be used in the hydrophilic treatment. In the corona discharge treatment, if a high voltage is applied to an electrode while a substrate and the electrode are being spaced apart at a certain interval, air existing between the substrate and the electrode is ionized so that particles of the ionized air changes the surface property of the plastic substrate, thereby generating a alcohol (OH) group, ketone (C=O) group or the like. The alkali treatment is a process of dipping the plastic substrate into an alkali aqueous solution for several tens seconds to several minutes, then cleansing it with water and evaporating its moisture in a dry oven. A NaOH aqueous solution may be a preferred example for a treating material suitable for the alkali treatment of the plastic substrate.

Films of triacetyl cellulose, polyethylene terephtalate, polymethyl methacrylate, polycarbonate, polyethylene and cycloolefin polymer such as norbornene derivatives, polyvinyl alcohol, diacetyl cellulose, polyether sulfone and the like may be examples for the plastic substrate on which the homeotropic alignment of a liquid crystal mixed solution containing a surfactant is possible after the corona discharge treatment has been executed. Since the plastic substrates are products frequently used in the industry, they can be easily obtained from various manufacturers, and they are not limited thereto.

Further, a specific plastic substrate such as a cellulose derivative film, inter alia, a triacetyl cellulose film is dipped into an alkali solution to process and then coated with a liquid crystal mixed solution containing a surfactant according to the present invention so that the plastic substrate of which surface has a hydrophilic group through the alkali treatment can obtain a homeotropic alignment liquid crystal layer. This is because an acetate group of the triacetyl cellulose film is hydrolyzed into an alcohol group in the alkali solution.

A detailed preparing process for forming the homeotropic alignment liquid crystal film by coating the liquid crystal mixed solution containing the surfactant and the reactive liquid crystal monomer on the plastic substrate or the glass substrate with its surface passing through the hydrophilic treatment such as the corona discharge or alkali treatment as described above will be described as follows.

First, although a method for coating the liquid crystal mixed solution on the glass substrate or the plastic substrate is not specifically limited, a method for coating in a uniform thickness is preferable. A method of spin coating, wire bar coating, micro gravure coating, gravure coating, dip coating, spray coating or the like is used as the coating method.

Although the thickness of a liquid crystal layer coated on the substrate is different depending on a retardation required to obtain, i.e., Δn(birefringence)*d(thickness of liquid crystal layer), it is preferred that the thickness of the liquid crystal layer be generally about 0.1 to 10 μm.

If the coating method is a method in that a solvent can be almost removed, and the coated liquid crystal layer does not drop or severely flow, a method for removing a solvent from a liquid crystal mixed solution coated at a predetermined concentration on a substrate is not specifically limited thereto, but a method of dry at room temperature, dry in a dry oven, dry on a heating plate by means of heating, dry using ultraviolet light or the like may be typically used.

After the solvent has been evaporated, there is needed a process of curing the homeotropic alignment liquid crystal layer by means of polymerization. A method of curing liquid crystal is largely classified into curing by light and by heat, and the reactive liquid crystal monomer used in the present invention, which is a photoreactive liquid crystal monomer, is a material fixed by ultraviolet radiation.

At this time, the polymerizing process is performed under presence of a photoinitiator absorbing a wavelength of an ultraviolet region, and the ultraviolet radiation may be performed in the atmosphere or under nitrogen atmosphere so as to increase a reactive efficiency by shielding oxygen.

An ultraviolet radiator uses a middle or high-pressure mercury ultraviolet lamp with a typical illuminance of about more than $100 \text{ mW/cm}^2$ or a metal halide lamp, and a cold mirror or other cooling devices may be installed between the substrate and the ultraviolet lamp such that the surface temperature of the liquid crystal layer becomes within the temperature range of liquid crystal.

Since the homeotropic alignment liquid crystal film of the present invention, which is prepared through the aforementioned method, uses a reactive liquid crystal monomer instead of a side-chain liquid crystal polymer so as to form the liquid crystal layer, the state of the UV-cured liquid crystal polymer is of a network structure, and a high temperature heat treatment process by a high glass transition temperature (Tg) is required for the homeotropic alignment liquid crystal film using the side-chain liquid crystal polymer. On the other hand, since the liquid crystal layer is polymerized and cured by ultraviolet radiation after the solvent has been evaporated, a high temperature heat treatment process is not required for the liquid crystal mixed solution containing the reactive liquid crystal monomer according to the present invention.

There are various methods of measuring the presence of homeotropic alignment of the homeotropic alignment liquid crystal film obtained through the method and a quantitative retardation value. The presence of homeotropic alignment of the homeotropic alignment liquid crystal film can be identified with the unaided eye or a polarization microscope between orthogonal polarizing plates.

That is, since the homeotropically aligned liquid crystal layer does not generate a retardation when the homeotropic alignment liquid crystal film according to the present invention is located between the orthogonal polarizing plates and viewed from a vertical incident direction with respect to a film surface, light transmission is not generated so that it is seen as black. Further, since the retardation is generated if the homeotropic alignment liquid crystal film is viewed while inclining an incident angle, light transmission is generated so that it is seen bright.

At this time, the quantitative retardation value in the direction inclined at a specific angle from the vertical incident angle can be measured using KOBRA-21ADH (produced by Oji Scientific Instruments in Japan), which is an automatic birefringence measuring device.

Preferably, one or more of those selected from the group consisting of triacetyl cellulose, polyethylene terephtalate, polymethyl methacrylate, polycarbonate, polyethylene and cycloolefin polymer such as norbornene derivatives, polyvinyl alcohol, diacetyl cellulose, polyether sulfone are used as an oriented retardation film which is laminated on the homeotropic alignment liquid crystal film prepared through the aforementioned method and integrated with the retardation film according to the present invention. Further, an oriented retardation film of which in-plane refractive index $R_{in}$ defined by the following Math Figure 1 has a range of 50 to 300 is preferably used. More preferably, a retardation film oriented in the direction perpendicular to the arrangement direction of liquid crystal molecules in a liquid crystal cell, of which $R_{in}$ has a range of 100 to 200 nm, is used.

$$R_{in} = \Delta n_{xy} \cdot d = (n_x - n_y) \cdot d \quad \text{[Math Figure 1]}$$

wherein $n_x$ is a refractive index from a direction in which the refractive index is the largest on a plane, $n_y$ is a refractive index from a direction perpendicular to the direction of $n_x$, in which the refractive index is the smallest on the plane, and d is a thickness of the film.

In a case where the oriented retardation film described above is joined with the homeotropic alignment liquid crystal film by an adhesive, or a plastic substrate treated to be hydrophilic so as to obtain the homeotropic alignment liquid crystal film is the oriented retardation film, the oriented retardation film used as a substrate and the homeotropic alignment liquid crystal film formed thereon are integrated as a single retardation film without any additional process.

The adhesive used in the adhesion of the oriented retardation film and the homeotropic alignment liquid crystal film is not specifically limited but may appropriately select to use an acryl-based polymer, a silicon-based polymer, polyester, polyurethane, polyamide, polyether, or a fluorine or rubber based polymer, which are referred to as a base polymer. In particular, an adhesive such as the acryl-based adhesive with superior properties in terms of optical transparency, appropriate wetting, cohesion, adhesion, weather-resistance, thermal resistance or the like may be preferably used.

The retardation film having the homeotropic alignment liquid crystal film and the oriented retardation film laminated and integrated therein is combined with a polarizing plate so that a polarizing film is finally obtained. The polarizing plate comprises a polarizing element obtained by absorbing dichromatic iodine to a hydrophilic polymer film such as a polyvinyl alcohol-based film and then uniaxially orienting it, and a transparent protection film attached on both sides of the polarizing element using an adhesive agent so as to protect the polarizing element.

Although a material of the transparent protection film generally uses triacetyl cellulose, it is not specifically limited thereto but may use polyethylene terephtalate, polymethyl methacrylate, polycarbonate, polyethylene and cycloolefin polymer such as norbornene derivatives, polyvinyl alcohol, diacetyl cellulose, polyether sulfone or the like as the same case as the aforementioned oriented retardation film. Thus, the oriented retardation film contained in the retardation film having the homeotropic alignment liquid crystal film and the oriented retardation film integrated therein may be also used as the transparent protection film of the polarizing element.

An IPS mode liquid crystal display includes the polarizing film so that a contrast ratio is increased, and a viewing angle and a color shift characteristic become better.

In the following embodiment, the retardation film having the homeotropic alignment liquid crystal film and the oriented retardation film integrated therein according to the present invention is arranged between the polarizing plate and the liquid crystal cell of the IPS mode liquid crystal display, and it can be seen that a viewing angle is improved, and the a color shift is decreased as compared with comparative examples.

Embodiment 1

In a liquid crystal monomer contained in a polymerizable photoreactive liquid crystal monomer mixed compound used in the embodiment of the present invention, a solid mixed in a ratio of a 40 wt. % compound of the Chemical Formula 1, a 27 wt. % compound of the Chemical Formula 2, a 27 wt. % compound of the Chemical Formula 3 and 6.0 wt. % Irgacure 907 (produced by Ciba-Geigy) is melted in a mixed solvent of 70 wt. % toluene and 30 wt. % cyclohexanone to be 25 wt. % concentration of the solid, so that a reactive liquid crystal solution is prepared.

Novec (product name, produced by 3M in U.S.A.) FC4430, which is a fluorocarbon-based surfactant, is added to be 1.0 wt. % as compared with the 100 wt % total solid contained in the total solution.

After a corona discharge treatment has been executed on a triacetyl cellulose film (product name: 80UZ produced by Fuji in Japan), the liquid crystal solution is coated on the film using a wire bar coater (No. 4), and the film is left at a temperature of 50° C. in a dry oven for two minutes and then cured once at a speed of 3 m/min. using a high-pressure mercury lamp of 80 W/cm. A liquid crystal film generated in this manner is transparent and the thickness thereof is 1.0 μm.

Since an acrylate group being a reactor generating a polymerization reaction is attached to one end of a part of compounds corresponding to the Chemical Formulas 1 and 2 in the structure of a liquid crystal polymer of the generated liquid crystal film, a part of polymers finally generated by the Chemical Formulas 1 and 2has a side-chain form as shown in FIG. 10. However, since an acrylate group is attached to both sides of a compound of the Chemical Formula 3, the finally generated polymer has a network structure as shown in FIG. 11. Further, the side-chain form by the compounds of the Chemical Formulas 1 and 2, and the network structure by the compounds of the Chemical Formula 3 are mixed so that the liquid crystal polymer entirely has a network structure as shown in FIG. 11

In order to examine an optical property of the liquid crystal film, only a liquid crystal film layer is exfoliated on the triacetyl cellulose film using a glass substrate having an adhesive coated thereon, and a retardation of the liquid crystal film layer depending on a viewing angle is measured using KOBRA-21ADH (product name, produced by Oji Scientific Instruments in Japan), which is an automatic birefringence measuring device. The result is shown in FIG. 1.

According to FIG. 1, since there is no retardation in a vertical direction of the film, the retardation is increased as the viewing angle becomes large, and values of the negative (−) directional and positive (+) directional viewing angles are symmetric to each other, it can be seen that liquid crystal molecules of the liquid crystal film are aligned in a vertical direction with respect to a surface of the film.

Further, assuming that an in-plain mean refractive index be $n_o$, a refractive index of a thickness direction be $n_e$, and a thickness of the liquid crystal film be d from a retardation value depending on a viewing angle, a retardation ($R_{th}$) value of a thickness direction, calculated by the following Math Figure 2, is 110 nm.

In FIG. 2, after a retardation film 8 in which a homeotropic alignment liquid crystal film 7 prepared through the aforementioned method and a Zeonor (product name, produced by Zeon in Japan) oriented retardation film 5 are integratedly laminated has been prepared, the retardation film 8 are located between a polarizing plate 1 (product name: ST-CLR, produced by LG Chem, Ltd in Korea) and a liquid crystal cell 2 of an IPS (In Plane Switching) mode liquid crystal display, and it is intended to identify a degree of improvement of a viewing angle property.

Here, a general polarizing plate 10 containing no retardation film contained between a liquid crystal cell 2 and the general polarizing plate 10 attached beneath the liquid crystal cell 2 is used to compare an effect of the hemeotropic alignment liquid crystal film 7 and the retardation film 8 prepared therewith according to the present invention with those of the Comparative Examples 2 and 3, which will be described later. Further, what the retardation film 8 is attached beneath the polarizing plate 1 so that they are integrated is referred to as a polarizing film 9.

At this time, the oriented direction 6 of the oriented retardation film 5 is perpendicular to the alignment direction 4 of liquid crystal molecules in the liquid crystal cell 2, and the in-plane retardation value $R_{in}$ of the oriented retardation film 5, which is a retardation value on a plane, is calculated by means of the following Math Figure 1. At this time, the retardation value $R_{th}$ of a thickness direction of the homeotropic alignment liquid crystal film 7, which is a retardation value of a thickness direction, is calculated by means of the following Math Figure 2.

$$R_{in} = \Delta n_{xy} \cdot d = (n_x - n_y) \cdot d \quad \text{[Math Figure 1]}$$

wherein $n_x$ is a refractive index from a direction in which the refractive index is the largest on a plane, $n_y$ is a refractive index from a direction perpendicular to the direction of $n_x$, in which the refractive index is the smallest on the plane, and d is a thickness of the film.

$$R_{th} = \Delta n \cdot d = (n_e - n_o) \cdot d \quad \text{[Math Figure 2]}$$

wherein $n_o$ is calculated as $(n_x + n_y)/2$, and $n_e$ is $n_z$.

Comparative Example 1

After a solid mixed in a ratio of 30 wt. % HEA (Hydroxyethyl acrylate), 30 wt. % HDDA (Hexanediol Diacrylate), 35 wt. % PETA (Pentaerythritol Triacrylate) and 5.0 wt. % Irgacure 907 (produced by Ciba-Geigy in Switzerland) is melted in a mixed solvent of 70 wt. % IPA (Isopropyl Alcohol) and 30 wt. % toluene such that a concentration of the solid becomes 10%, Novec (product name, produced by 3M in U.S.A.) FC4430, which is a fluorocarbon-based surfactant, is added to be 2.0 wt. % as compared with the 100 wt % total solid contained in the total solution so that an alignment film solution is prepared.

The alignment film solution is coated on the film using a wire bar coater (No. 5), and the film is left at a temperature of 50° C. in a dry oven for two minutes and then cured once at a speed of 3 m/min. using a high-pressure mercury lamp of 80 W/cm. The generated alignment film is transparent and the thickness thereof is 0.7 μm.

A liquid crystal film with a thickness of 1.0 μm is prepared on the alignment film using a reactive liquid crystal solution having only FC4430, which is a surfactant, removed from the same reactive liquid crystal solution as the Embodiment 1 by means of the same coating and photocuring operation as the Embodiment 1, and a retardation of the liquid crystal film is measured in the same manner as the Embodiment 1.

According to the Comparative Example 1, a shift of retardation values depending on a viewing angle is shown in FIG. 12, and a retardation ($R_{th}$) of a thickness direction is 103 nm.

In the Comparative Example 1 like the Embodiment 1, since the retardation is increased as the viewing angle becomes large, and values of the negative (−) directional and positive (+) directional viewing angles are symmetric to each other, it can be seen that liquid crystal molecules of the liquid crystal film are also aligned in a vertical direction with respect to a surface of the film.

Further, since the retardation ($R_{th}$) value of a thickness direction in the Comparative Example 1 has little difference from that of the Embodiment 1, it can be seen that there is no difference of alignment degrees therebetween.

Comparative Example 2

In FIG. 3, polarizing plates 1 and 10 are respectively attached on and beneath a liquid crystal cell 2, and arranged such that any retardation films are not contained between the polarizing plates 1 and 10 attached on and beneath the liquid crystal cell in order to compare the effect of the Embodiment 1 having a retardation film in which a homeotropic alignment liquid crystal film and an oriented retardation film are integratedly laminated.

At this time, the orientation directions 3 and 30 of the polarizing plates 1 and 10 are perpendicular to each other, and the alignment direction 4 of liquid crystal molecules in the liquid crystal cell 2 is the same as that of the polarizing plate 10 attached beneath the liquid crystal cell 2.

Comparative Example 3

In FIG. 4, after only a Zeonor (product name, produced by Zeon in Japan) oriented retardation film 5, of which $R_{in}=120$ nm, is joined with a general polarizing plate 1 using an adhesive so that a polarizing film 11 is prepared, the polarizing film 11 is attached on a liquid crystal cell 2.

At this time, the orientation direction 6 of the oriented retardation film 5 is perpendicular to the arrangement direction of liquid crystal molecules in the liquid crystal cell 2, and the $R_{in}$ of the oriented retardation film 5, which is a retardation value on a plane, is calculated by means of the following Math Figure 1.

$$R_{in} = \Delta n_{xy} \cdot d = (n_x - n_y) \cdot d \quad \text{[Math Figure 1]}$$

wherein $n_x$ is a refractive index from a direction in which the refractive index is the largest on a plane, $n_y$ is a refractive index from a direction perpendicular to the direction of $n_x$, in which the refractive index is the smallest on the plane, and d is a thickness of the film.

In order to estimate viewing angle characteristics of the liquid crystal cells attached to the polarizing films 9 and 11 of the Embodiment 1 and the Comparative Example 3, and the polarizing plate 1 of the Comparative Example 2, a contrast ratio measured using EZ contrast 160R (product name) produced by Eldim in France is shown in FIG. 5.

For reference, the most frequently used method among those for estimating a viewing angle characteristic is the measurement of a contrast ratio, and the contrast ratio is a value dividing transmittance of a white state by that of a black state. As the value is increased, an image is distinct, and a visibility degree is high. Since a liquid crystal display has a characteristic in that a contrast ratio is shifted depending on a viewing angle, the viewing angle characteristic can be quantified through a shift degree of the contrast ratio depending on an incident angle. In a case where the contrast ratio is generally observed while shifting the incident angle with an azimuth angle in which light is leaked the most in a black state as reference, it is easy to compare a relative viewing angle characteristic.

FIG. 6 is a view showing an azimuth angle (Φ) and a polar angle (Θ) in a spherical coordination system. The azimuth angle refers to a counterclockwise rotation angle from the +X axis when observing from the direction of the +Z axis, and the polar angle (Θ) refers to an angle inclined from the direction of the +Z axis perpendicular to a plane to an XY plane. Since the polar angle is also referred to as an incident angle depending on a case, the incident angle means the polar angle hereinbelow.

Thus, in case of an IPS mode LCD, since the orientation axis or absorption axis of a polarizing plate is respectively an azimuth angle of 0° or 90° (in a case where a right horizontal direction is defined as 0° when observing the LCD from the front), a contrast ratio observed while an incident angle is being shifted from 0° to 80° at an azimuth angle of 45° is shown in FIG. 5.

Further, the following Table 1 shows a contrast ratio measured by the 20° for each polarizing film structure in FIG. 5.

TABLE 1

| Structure | Θ(°) | | | | |
|---|---|---|---|---|---|
| | 0° | 20° | 40° | 60° | 80° |
| FIG. 2 | 305 | 271 | 166 | 56.1 | 39.2 |
| FIG. 3 | 305 | 183 | 33.2 | 9.73 | 2.58 |
| FIG. 4 | 305 | 230 | 94.6 | 27.8 | 15.1 |

Through FIG. 5 and Table 1, it can be seen that the contrast ratio of the polarizing film 9 containing both of the oriented retardation film 5 and the homeotropic alignment liquid crystal film 7 of FIG. 2 is increased by about 1,520% as compared with the general polarizing plate 1 of FIG. 3, and also increased by about 260% as compared with the polarizing film 11 of FIG. 4.

Next, color shift characteristics of the liquid crystal displays of the Embodiment 1 with the structure of FIG. 2 and the Comparative Examples 2 and 3 with structures of FIGS. 3 and 4 will be compared.

In general, since the color shift of an liquid crystal display shows a larger shifting width when continuously measuring the entire azimuth angles of 0° to 360° at a fixed incident angle of over 70° as compared with when fixing the azimuth angle and shifting the incident angle, each color shift characteristic is measured while shifting the azimuth angle by the 1° from 0° to 360° in a state where an incident angel for estimating the color shifting characteristic is fixed as 75°.

At this time, the measured values are x and y used in the xy chromaticity diagram established by CIE (International Illumination Committee) in 1964, and the measuring equipment is EZ contrast 160R (product name) produced by Eldim in France, which is used in the Embodiment 1.

FIG. 7 shows a color shift characteristic of the structure of FIG. 2, i.e., a liquid crystal display having the polarizing film 9, on which the retardation film 8 having the homeotropic alignment liquid crystal film 7 and the oriented retardation film 5 laminated on the general polarizing plate 1 is further laminated, attached therein. Further, it can be seen that the color shift is of the smallest quantity when the polarizing film 9 having the retardation film 8 of FIG. 2 laminated thereon is used.

FIG. 8 shows a color shift characteristic of the structure of FIG. 3, i.e., a liquid crystal display having the general polarizing plate 1 attached therein, and FIG. 9 shows a color shift characteristic of the structure of FIG. 4, i.e., a liquid crystal display in which the polarizing film 11 having only the oriented retardation film attached on the general polarizing plate 1 attached therein.

In the following Table 2, values of the maximum x and y, and the minimum x and y in each of the FIGS. 7, 8 and 9 are obtained, and Δx and Δy, each of which is a difference of the maximum and the minimum values, are then calculated. At this time, as the Δvalue becomes small, a degree of the color shifts at the entire azimuth angles becomes small. That is, the color shift characteristic is superior.

TABLE 2

| | Compensation Structure | | | | | |
|---|---|---|---|---|---|---|
| | FIG. 2 | | FIG. 3 | | FIG. 4 | |
| | Color Coordinate | | | | | |
| | x | y | x | y | x | y |
| Max. | 0.3213 | 0.2865 | 0.4143 | 0.3775 | 0.4011 | 0.3662 |
| Min. | 0.2087 | 0.1516 | 0.2039 | 0.1531 | 0.2014 | 0.1564 |
| Max. – Min. (Δ) | 0.1127 | 0.1349 | 0.2104 | 0.2243 | 0.1997 | 0.2098 |

As a result of the Table 2, the compensation structure of FIG. 2 is decreased by 46.4% in Δx and 39.9% in Δy as compared with that of FIG. 3. Further, it can be seen that the compensation structure of FIG. 2 is decreased by 43.6% in Δx and 35.7% in Δy as compared with that of FIG. 4 so that the color shift is more decreased.

Although the present invention has been described in detail in connection with the specific embodiments, it will be readily understood by those skilled in the art that various modifications and changes can be made thereto within the technical spirit and scope of the present invention. It is also apparent that the modifications and changes fall within the scope of the present invention defined by the appended claims.

INDUSTRIAL APPLICABILITY

There is an advantage in that if a retardation film according to the present invention is arranged between a polarizing element or polarizing plate, and a liquid crystal cell, the contrast ratio of an liquid crystal display is can be increased up to about 1520%, and a color shift can be also decreased so that viewing angle and color shift characteristics can be improved.

Further, there is an advantage in that a homeotropic alignment liquid crystal film providing a retardation of the thickness direction of a retardation film according to the present invention is not required for high-temperature heat treatment and cooling processes of a long time period contrary to a conventional preparing method using a side-chain liquid crystal polymer, so that it can be applied to a high-speed continuous process, thereby reducing a processing time and improving productivity.

The invention claimed is:

1. A retardation film wherein an oriented retardation film of which surface is treated to be hydrophilic and a homeotropic alignment liquid crystal film formed from a solution containing a polymerizable reactive liquid crystal monomer are laminated such that they are integrated, wherein a solution containing the polymerizable reactive liquid crystal monomer contains a reactive liquid crystal monomer of following Chemical Formula 3 and at least one or more of reactive liquid crystal monomers of following Chemical Formulas 1 and 2

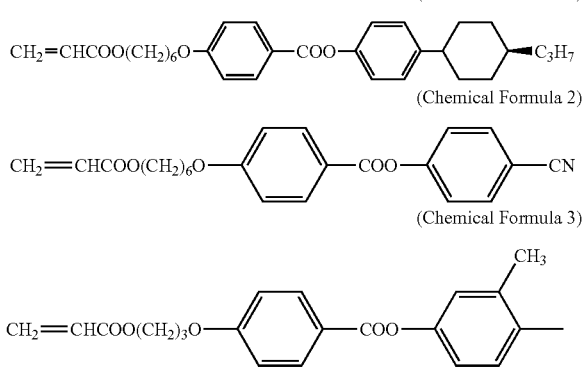

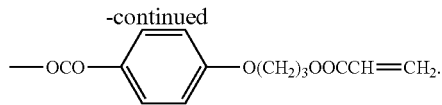

2. The retardation film as claimed in claim 1, wherein a material of the oriented retardation film is one or more of those selected from the group consisting of triacetyl cellulose, polyethylene terephtalate, polymethyl methacrylate, polycarbonate, polyethylene and cycloolefin polymer, polyvinyl alcohol, diacetyl cellulose, polyether sulfone.

3. A polarizing film wherein the retardation film of claim 1 or 2 is attached on a polarizing plate and located between the polarizing plate and a liquid crystal cell.

4. An IPS mode liquid crystal display including the polarizing film of claim 3.

* * * * *